(12) United States Patent
McCartney

(10) Patent No.: US 6,636,751 B1
(45) Date of Patent: Oct. 21, 2003

(54) EMERGENCY POWER SUPPLY FOR CELLULAR TELEPHONE

(76) Inventor: William John McCartney, 1965 Peachbluff Dr., Duluth, GA (US) 30097

( * ) Notice: Subject to any disclaimer, the term of this patent is extended or adjusted under 35 U.S.C. 154(b) by 456 days.

(21) Appl. No.: 09/721,825

(22) Filed: Nov. 23, 2000

(51) Int. Cl.$^7$ ................................................ H04Q 7/32
(52) U.S. Cl. .................... 455/572; 455/573; 455/343.6; 320/106; 320/127
(58) Field of Search ................................. 455/572, 573, 455/343, 89, 343.6; 320/112, 132, 150, 127

(56) References Cited

U.S. PATENT DOCUMENTS

| | | | | |
|---|---|---|---|---|
| 5,136,229 A | * | 8/1992 | Galvin | ........................ 320/112 |
| 5,155,860 A | * | 10/1992 | McClure | ...................... 455/409 |
| 5,461,664 A | * | 10/1995 | Cappadona | ................... 455/572 |
| 6,387,553 B1 | * | 5/2002 | Putt et al. | ........................ 429/3 |
| 6,522,873 B1 | * | 2/2003 | Moles et al. | ................. 455/343 |
| 6,526,294 B1 | * | 2/2003 | Banh et al. | .................. 455/573 |

* cited by examiner

*Primary Examiner*—Nay Maung
*Assistant Examiner*—Alan T. Gantt

(57) ABSTRACT

An electrochemical emergency power supply for a cellular telephone otherwise having a main battery. The emergency power supply, once activated, provides the cellular telephone with power for operation of the cellular telephone for at least a predetermined duration. The emergency power supply is an emergency cell that is selectively activated by the cellular telephone user, preferably through the exposure of the emergency cell to ambient air, when needed. The preferred emergency cell is an oxidizing zinc-air electrochemical cell that is held in a hermetically-sealed compartment which is selectively unsealed to activate the emergency power supply.

6 Claims, 1 Drawing Sheet

EMERGENCY POWER SUPPLY FOR CELLULAR TELEPHONE

TECHNICAL FIELD

This invention relates generally to cellular telephones and their power supplies. More particularly, the present invention relates to an emergency power supply contained within a cellular telephone, separate from the main battery, which can be activated for a temporary supply of power.

BACKGROUND

Cellular telephones typically have a main rechargeable battery, which can be comprised of a series of electrochemical cells in series or in parallel, and that main battery provides electricity to all functioning components of the cellular telephone. Once the main battery has discharged its energy, the cellular telephone can no longer send or receive transmissions. Most cellular telephones have a power level indicator or other warning method to alert the user of the cellular telephone of the remaining charge on the telephone and if a power failure is imminent.

However, the onset of the complete discharge of the main battery can occur very quickly when the cellular telephone is actively being used for communication. Furthermore, most charge warning indicators on cellular telephones do not indicate the amount of communication remaining that the main battery will support. Thus, the user may find a dead battery, which is a serious problem if that user then needs to make an emergency telephone call. If there is not another power source to either power the cellular telephone or recharge the discharged main battery, the cellular telephone will remain inoperative.

In electronic devices, it is known to provide an emergency power source to either power the device for a limited duration, or to power the device solely to keep data storage facilities (such a volatile memory) powered for the maintenance of the data. An example of short storage would be a universal power supply for a computer that provides reserve power to the computer after main power loss. The reserve power lasts long enough for a user to exit all critical operations before the computer stops running. An example of a battery backing up a specific function is the use of an alkaline or rechargeable battery in a bedside radio-alarm clock whereby the clock continues to keep time after the main power has ceased.

Accordingly, there is a need for an improved power supply to provide emergency power for electronic accessories.

DETAILED DESCRIPTION OF THE INVENTION

Figure 1:
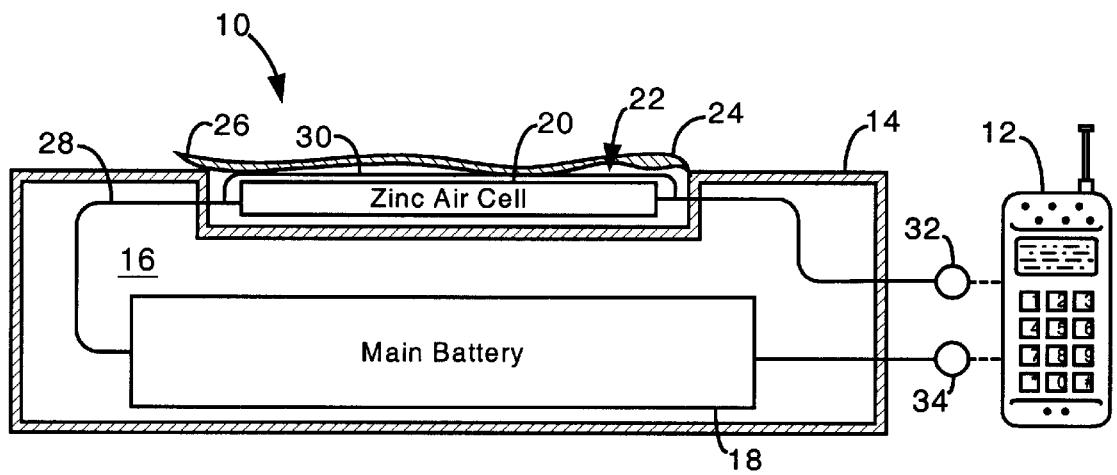
FIG. 1 is a cross section of a cellular telephone battery having a first embodiment of the emergency power supply.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

FIG. 1 is cross section of a cellular telephone battery 10 for a cellular telephone 12, where the battery 10 has a first embodiment of the emergency power supply. The cellular telephone battery 10 has a battery housing 14, and within the interior 16 of the battery housing 14 is the main battery 18, which for a cellular telephone battery is typically a rechargeable lithium-ion battery. The interior 16 of the battery housing 14 can either be hermetically-sealed or not in the first embodiment, depending upon design requirements. Another potential method of sealing the battery is a vacuum-pack seal similar to those found in food products such as coffee. In this sealing, a foil is placed over the cavity and the underlying air is then removed. This sealing method needs only an airtight sealant glue, and does not need the excessive force generally equated with hermetic sealing. For the purposes of this application, "hermetically-sealed" refers to any air-tight sealing method regardless of the force holding the cavity and top together.

The first embodiment of the emergency power supply here consists of an oxidizing zinc-air battery 20 contained in a hermetically-sealed compartment 22. The hermetically-sealed compartment 22 has a removable cover, which here is a foil cover 24 having a pull-tab 26. The emergency electrochemical cell (zinc-air battery 20) is in connection with the main battery 18 through wire 28, and to one or more power terminals, such as terminals 32 and 34, for providing power to the cellular telephone 12. There is a bypass 30 of the main power wire 28 that circumvents the inactive zinc-air battery 30 and allows power to flow around the zinc-air battery 20 during normal current flow of the main battery 18. The bypass wire 30 is also attached to the foil cover 24 and designed to detach from wire 28 such that the bypass 30 will be removed from the power circuit upon the foil cover 24 being removed from the hermetically-sealed compartment 22.

Accordingly, when the pull-tab 26 is pulled by the user to activate the emergency power supply, the either partial or full removal of the foil cover 24 unseals the hermetically-sealed compartment 22 to cause the unsealed zinc-air battery 20 to be exposed to ambient air, removes the bypass 30, and thus causes the zinc-air battery 20 to generate an electrical current. Because the active zinc-air battery 20 is in the power circuit, the zinc-air battery 20 provides power to the terminals 32 and 34 to provide power to the cellular telephone 12. The emergency electrochemical cell (zinc-air battery 20) can provide sufficient power for operation of the cellular telephone for at least a predetermined duration, such as sufficient power to support a 2 minute emergency phone call from the cellular telephone 12.

Figure 2:
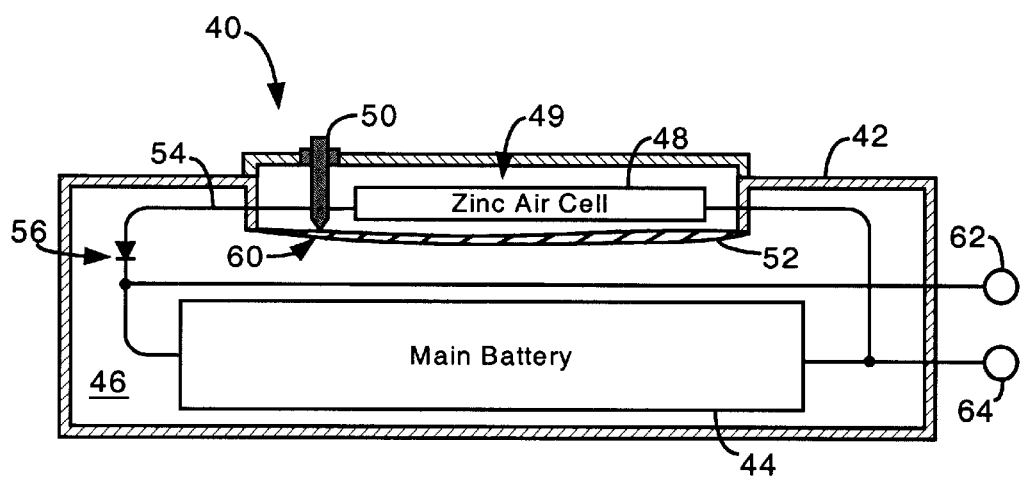
FIG. 2 is a cross section of a cellular telephone battery having a second embodiment of the emergency power supply.

With reference to FIG. 2, there is shown a cross-section of a second embodiment of the cellular telephone battery 40 having an emergency power supply. The cellular telephone battery 40 has a battery housing 42 having an interior 46 thereof. The main battery 44 is held within the interior 46 and is in a parallel power circuit with an emergency cell, which here is oxidizing zinc-air battery 48. The emergency power supply here is an oxidizing zinc-air battery 48 held within a hermetically-sealed compartment 49 including a permeable section 52, which here is a foil wall between the interior 46 of the battery housing 42 and the hermetically-sealed compartment 49. The battery housing 42 includes a puncturing device 50 that is accessible to a user from the exterior of the battery housing 42, and the puncturing device 50 selectively punctures the permeable portion 52 to unseal the hermetically-sealed compartment 49. The interior 46 of the battery housing 42 contains sufficient oxygen, either through exposure to ambient air or through the sealing of adequate air therein, to oxidize the zinc-air battery 48 once the puncturing device 50 punctures the permeable cover 52 at point 60, which thus causes the zinc-air battery 48 to generate power.

The oxidizing zinc-air battery 48 is in parallel connection with the main battery 44 through wire 54 to terminals 62 and 64, as opposed to the series connection of the emergency power supply of the first embodiment of FIG. 1. Thus, the zinc-air battery 48 does not require a bypass, such as bypass wire 30 in FIG. 1. Instead, the second embodiment uses a diode 56 to prevent the back flowing of electricity from the main battery 44 to the zinc-air battery 48.

Consequently, to use the emergency power supply of the second embodiment, when the main battery 44 lacks sufficient electricity to power the cellular telephone 12 from terminals 62 and 64, the user can depress the puncturing device 50 which punctures the permeable portion 52 of the hermetically-sealed compartment 49 at point 60 to unseal the hermetically-sealed compartment 49 and let in the oxidizing air within the interior 46 of the battery housing 42. The zinc-air battery 48 then electrochemically produces a current on wire 54 and the diode 56 permits the flow of electricity between the terminals 62 and 64. As with the first embodiment, the zinc-air battery 48 has enough capacity to power the cellular telephone for at least a predetermined duration, such as 2 minutes, which should be sufficient for an emergency phone call.

While the emergency power supply is shown here as a one-time activatable oxidizing zinc-air battery, other electrochemical cells, either oxidizing or not, can be used as the emergency power supply. Further, other power sources can be used as the emergency power supply such as an oxidizing fuel cell. Additionally, the emergency power supply does not need to be a one-time usable electrochemical cell, and can be a rechargeable electrochemical cell or other power cell. The zinc-air battery is preferred here due to its anaerobic storage capability and its excellent power to weight ratio when active. It is known in the art that the more efficient power to weight ratios are generated by single use discharging electrochemical cells, such as alkaline cells. Consequently, rechargeable electrochemical cells are not very practical for use in the present invention as they have a disadvantageous power to weight ratio for powering the full operation of the cellular telephone, where minimal size and weight of the emergency power supply is desired. Moreover, rechargeable electrochemical cells tend to have a shorter shelf-life of inactivity than does a single use battery.

While there has been shown a preferred and an alternate embodiment of the present invention, it is to be understood that certain changes may be made in the forms and arrangement of the elements without departing from the underlying spirit and scope of the invention as is set forth in the claims.

What is claimed is:

1. An electrochemical emergency power supply for a cellular telephone having a main battery, the emergency power supply comprising an emergency cell that is in connection with one or more terminals through which the main battery provides power to the cellular telephone, and the emergency cell is selectively activated by a user to provide sufficient power for operation of the cellular telephone for at least a predetermined duration, wherein:

the main battery is in a battery housing, and the battery housing includes a separate hermetically-sealed compartment; and the emergency cell is held within the hermetically-sealed compartment, the emergency cell generating a current upon the cell being exposed to ambient air, wherein the hermetically-sealed compartment is selectively unsealed to activate the emergency cell to power the cellular telephone.

2. The emergency power supply of claim 1, wherein the emergency power supply is selected from the group consisting of a zinc-air electrochemical cell, a metal-oxidizing cell, a bio-generative cell and a fuel cell.

3. The emergency power supply of claim 1, wherein the hermetically-sealed compartment includes a removable cover, and the release of hermetic seal is accomplished by removing at least a portion of the cover from the hermetically-sealed compartment.

4. The emergency power supply of claim 1, wherein: the hermetically-sealed compartment includes a selectively permeable portion; and the battery housing includes a puncturing device accessible from the exterior of the battery housing, wherein the puncturing device selectively punctures the permeable portion of the compartment to unseal the hermetically-sealed compartment.

5. The emergency power supply of claim 1, wherein the emergency cell is in series with the main battery and the one or more terminals.

6. The emergency power supply of claim 1, wherein the emergency cell is in parallel with the main battery and the one or more terminals.

* * * * *

UNITED STATES PATENT AND TRADEMARK OFFICE
CERTIFICATE OF CORRECTION

| | |
|---|---|
| PATENT NO. | : 6,636,751 B1 |
| APPLICATION NO. | : 09/721825 |
| DATED | : October 21, 2003 |
| INVENTOR(S) | : William John McCartney |

It is certified that error appears in the above-identified patent and that said Letters Patent is hereby corrected as shown below:

[73] Assignee: should read --Motorola, Inc., Schaumburg, IL (US)--.

[74] should read --Attorney, Agent, or Firm – Philip H. Burrus, IV--.

Signed and Sealed this

Twenty-ninth Day of May, 2007

JON W. DUDAS
*Director of the United States Patent and Trademark Office*